United States Patent
Abe et al.

(10) Patent No.: US 11,035,337 B2
(45) Date of Patent: Jun. 15, 2021

(54) HYDROELECTRIC SYSTEM

(71) Applicant: DAIKIN INDUSTRIES, LTD., Osaka (JP)

(72) Inventors: Takahiro Abe, Osaka (JP); Atsushi Suhara, Osaka (JP); Yoshiyuki Harada, Osaka (JP); Tomomi Sakamoto, Osaka (JP); Yusuke Irino, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 16/645,685

(22) PCT Filed: Sep. 11, 2018

(86) PCT No.: PCT/JP2018/033631
§ 371 (c)(1),
(2) Date: Mar. 9, 2020

(87) PCT Pub. No.: WO2019/065217
PCT Pub. Date: Apr. 4, 2019

(65) Prior Publication Data
US 2020/0277929 A1 Sep. 3, 2020

(30) Foreign Application Priority Data

Sep. 29, 2017 (JP) .............................. JP2017-189999

(51) Int. Cl.
*F03B 15/00* (2006.01)
*F03B 15/06* (2006.01)
(Continued)

(52) U.S. Cl.
CPC .............. *F03B 15/06* (2013.01); *H02P 9/008* (2013.01); *H02P 2101/10* (2015.01)

(58) Field of Classification Search
CPC .... F03B 15/06; F03B 15/04; F05B 2270/107; F05B 2270/1032; H02P 9/008; H02P 2101/10; H02P 9/04; Y02E 10/20
See application file for complete search history.

(56) References Cited

U.S. PATENT DOCUMENTS

| | | | | |
|---|---|---|---|---|
| 4,109,160 A | * | 8/1978 | Goto | ........................ F03B 15/14 |
| | | | | 290/52 |
| 4,496,845 A | * | 1/1985 | Ensign | .................... F03B 15/12 |
| | | | | 290/43 |

(Continued)

FOREIGN PATENT DOCUMENTS

| JP | 2004-364357 A | 12/2004 |
|---|---|---|
| JP | 2009-108756 A | 5/2009 |

(Continued)

OTHER PUBLICATIONS

International Preliminary Report of corresponding PCT Application No. PCT/JP2018/033631 dated Mar. 31, 2020.

(Continued)

*Primary Examiner* — Julio C. Gonzalez
(74) *Attorney, Agent, or Firm* — Global IP Counselors, LLP (57) ABSTRACT

A hydroelectric generation system includes a fluid machine disposed in a penstock or channel, a generator driven by the fluid machine, and a control unit configured to generate a predetermined torque in the generator. Fluid flows through the penstock or channel. The penstock or channel has a main path in which the fluid machine is disposed, and a detour disposed in parallel with the main path. The detour includes an on-off valve. The on-off valve is opened when not electrified, and closed when electrified.

3 Claims, 7 Drawing Sheets (51) Int. Cl.
    *H02P 9/00*      (2006.01)
    *H02P 101/10*    (2015.01)

(56) References Cited

U.S. PATENT DOCUMENTS

| | | | |
|---|---|---|---|
| 10,352,293 B2 * | 7/2019 | Sakamoto | F03B 13/08 |
| 2017/0314527 A1 | 11/2017 | Sakamoto et al. | |

FOREIGN PATENT DOCUMENTS

| | | |
|---|---|---|
| JP | 2010-77971 A | 4/2010 |
| JP | 2013-223324 A | 10/2013 |
| JP | 2014-214710 A | 11/2014 |
| JP | 2016-84814 A | 5/2016 |

OTHER PUBLICATIONS

International Search Report of corresponding PCT Application No. PCT/JP2018/033631 dated Dec. 4, 2018.
European Search Report of corresponding EP Application No. 18 86 0104.1 dated Oct. 23, 2020.

* cited by examiner

HYDROELECTRIC SYSTEM

CROSS-REFERENCE TO RELATED APPLICATIONS

This U.S. National stage application claims priority under 35 U.S.C. § 119(a) to Japanese Patent Application No. 2017-189999, filed in Japan on Sep. 29, 2017, the entire contents of which are hereby incorporated herein by reference.

BACKGROUND

Field of the Invention

The present invention relates to a hydroelectric generation system.

Background Information

There has been a hydroelectric generation system that generates power by a fluid, such as water, flowing through a penstock or channel. For example, a hydroelectric generation system disclosed in Japanese Unexamined Patent Publication No. 2014-214710 has a penstock or channel connected to a hydraulic turbine serving as a fluid machine. When the fluid causes the hydraulic turbine to rotate, a generator connected to the hydraulic turbine is driven. Power output by the generator is supplied to an electric power system by, for example, a reverse power flow. Such a hydroelectric generation system includes a control unit. The control unit makes the generator produce a predetermined torque to control the flow rate or pressure of water flowing through the hydraulic turbine.

SUMMARY

However, if the hydroelectric generation system or the electric power system enters into an abnormal state to cause loss of power, the power output by the generator cannot be reversely flowed. When the control unit is thus stopped to adjust the output current to zero, the torque produced by the generator is lost. This causes the hydraulic turbine to rotate at the runaway speed, resulting in lack of the flow rate or pressure of water flowing through the penstock or channel.

It is an object of the present invention to prevent the flow rate or pressure of water flowing through a penstock or channel from lacking even when power is lost.

A first aspect of the invention is directed to a hydroelectric generation system including: a fluid machine (21) disposed in a penstock or channel (1) through which a fluid flows; a generator (22) driven by the fluid machine (21); and a control unit (40) configured to generate a predetermined torque in the generator. The penstock or channel (1) has a main path (12) in which the fluid machine (21) is disposed, and a detour (13) provided in parallel with the main path (12). The detour (13) includes an on-off valve (16). The on-off valve (16) is opened when not electrified, and the on-off valve (16) is closed when electrified.

According to the first aspect of the invention, when the on-off valve (16) is electrified, the on-off valve (16) is closed. Thus, the fluid flows through the main path (12) without flowing through the detour (13). On the other hand, when power is lost, the on-off valve (16) is opened without being electrified. Thus, water flows through the detour (13).

A second aspect of the invention is an embodiment of the first aspect. In the second aspect, the system of the first aspect may further include an abnormality detector (23, 24) configured to detect an abnormality in the hydroelectric generation system (10). If the abnormality detector (23, 24) detects the abnormality, electrification of the on-off valve (16) may be stopped.

According to the second aspect of the invention, when the abnormality detector (23, 24) detects an abnormality, the on-off valve (16) is opened, and the fluid flows through the detour (13).

A third aspect of the invention is an embodiment of the second aspect. In the third aspect, the abnormality detector (23, 24) may detect an abnormality based on an effective head of the fluid machine (21).

According to a third aspect of the invention, when the effective head of the fluid machine (21) is a value at which the fluid machine (21) cannot operate properly, a determination is made that an abnormality has occurred in the hydroelectric generation system (10). This allows the fluid to flow through the detour (13).

A fourth aspect of the invention is an embodiment of any one of the first to third aspects. In the fourth aspect, the main path (12) may include an on-off valve (15), the on-off valve (15) being closed when not electrified, the on-off valve (15) being opened when electrified, and the detour (13) may include a first adjuster (71) configured to mechanically adjust a pressure or a flow rate of the fluid.

According to the fourth aspect of the invention, when power is lost, the on-off valve (15) disposed in the main path is closed without being electrified. Thus, the fluid does not flow into the main path (12). The pressure or flow rate of the fluid flowing through the detour (13) is mechanically adjusted by the first adjuster (71).

A fifth aspect of the invention is an embodiment of any one of the first to third aspects. In the fifth aspect, the penstock or channel (1) may have an outflow pipe (14) disposed downstream of the main path (12) and the detour (13) such that the main path (12) and the detour (13) are joined together, and the outflow pipe (14) may include a second adjuster (81) configured to mechanically adjust a pressure or a flow rate of the fluid.

According to the fifth aspect of the invention, the pressure or flow rate of the fluid flowing through the outflow pipe (14) at which the main path (12) and the bypass (13) are joined together can be adjusted.

According to the present invention, even when power is lost, an on-off valve (16) switches to an open state. As a result, a fluid is guided to a detour (13). This allows the fluid to flow through a penstock or channel (1) at a predetermined flow rate and a predetermined pressure.

According to the second aspect of the invention, even when power is supplied, an abnormality in a hydroelectric generation system (10) can be substantially prevented from causing the fluid to flow through the penstock or channel (1) at an insufficient flow rate and pressure.

According to the third aspect of the invention, if an operating region of a fluid machine (21) is a region where cavitation can occur, or if the effective head decreases so that the number of rotations of the fluid machine (21) becomes extremely small, a determination is made that the hydroelectric generation system (10) is in an abnormal state. This allows the fluid to be guided to a detour (13). Thus, before the fluid flowing into the fluid machine (21) under abnormal conditions causes a malfunction in the fluid machine (21), the fluid can be guided to the detour (13).

According to the fourth aspect of the invention, when power is lost, the fluid does not flow through the main path (12) but flows through the detour (13) including a first adjuster (71). Therefore, even when power is lost, the flow rate or pressure of the fluid flowing through the penstock or channel (1) can be adjusted.

According to the fifth aspect of the invention, the flow rate or pressure of the fluid flowing through the penstock or channel (1) can be adjusted even when power is lost.

DETAILED DESCRIPTION OF EMBODIMENT(S)

Embodiments of the present invention will be described in detail with reference to the drawings. Note that the following embodiments and variations are merely beneficial examples in nature, and are not intended to limit the scope, applications, or use of the present invention.

Embodiment

An embodiment will be described.

Figure 1:
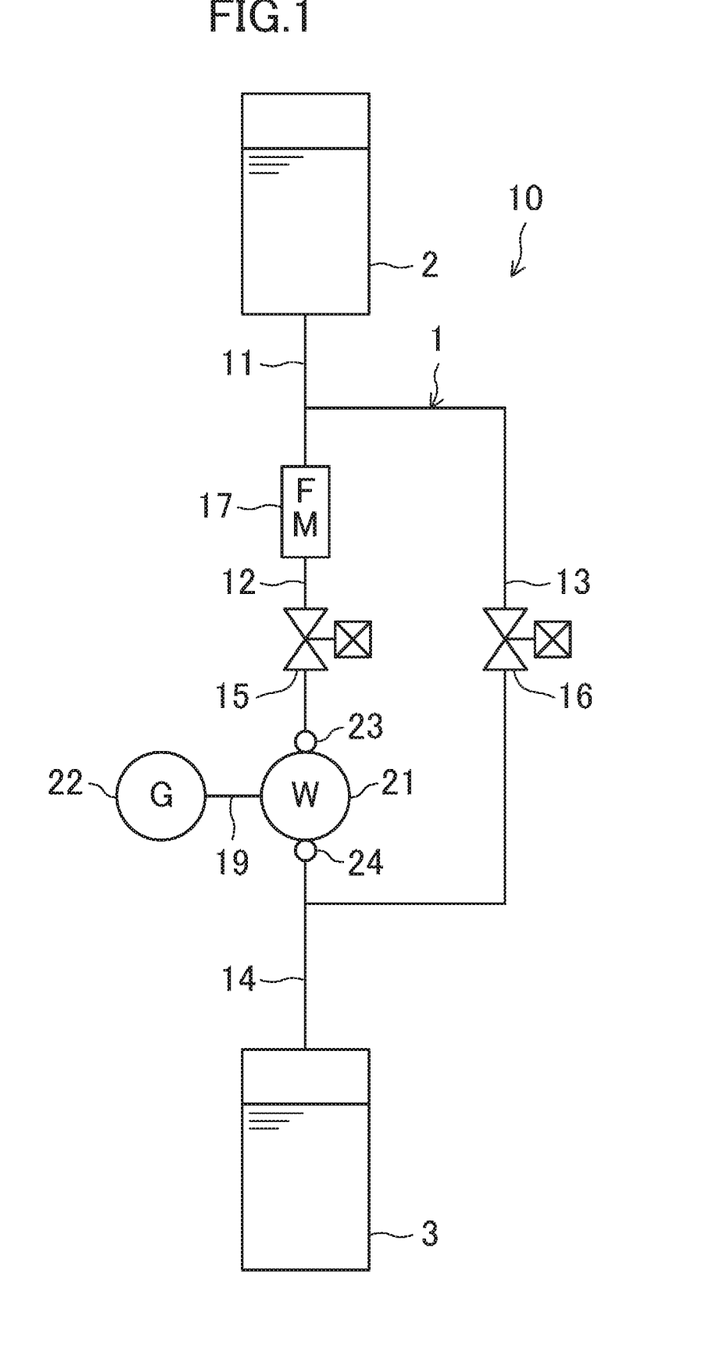
FIG. 1 is a diagram schematically illustrating an overall configuration of a pipe included in a hydroelectric generation system according to an embodiment.

FIG. 1 is a diagram schematically illustrating an overall configuration of a pipe (1) included in a hydroelectric generation system (10) according to an embodiment of the present invention. The pipe (1) is an exemplary penstock or channel through which water serving as a fluid flows with a head. In this embodiment, the pipe (1) is provided between each adjacent pair of a plurality of ponds. The pipe (1) is disposed to connect a water storage tank (2) provided for one of the adjacent ponds upstream of the pipe (1) and a water receiving tank (3) provided for the other pond downstream of the pipe (1) together.

«Hydroelectric Generation System»

Figure 2:
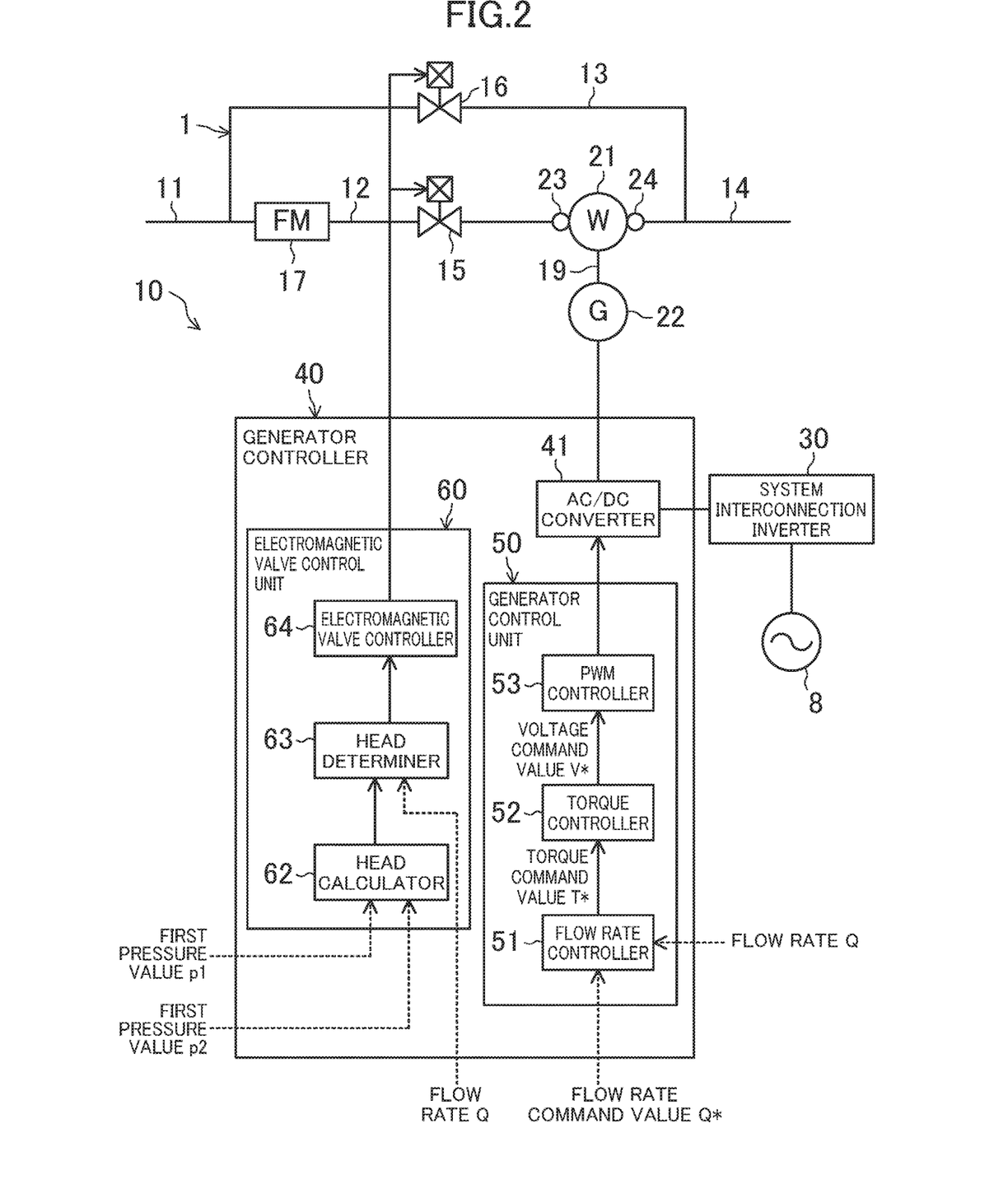
FIG. 2 is a diagram illustrating an electric power system of the hydroelectric generation system.

As shown in FIG. 1, the hydroelectric generation system (10) includes a hydraulic turbine (21) and a generator (22). FIG. 2 is a diagram illustrating an electric power system of the hydroelectric generation system (10). The hydroelectric generation system (10) includes a generator controller (40) serving as a control unit and a system interconnection inverter (30). The hydroelectric generation system (10) generates power, which is supplied to an electric power system (8). In this example, the electric power system (8) is a so-called "commercial power." In the hydroelectric generation system (10), the supply of power to a commercial power system (so-called "reverse power flow") allows so-called "power selling."

—Hydraulic Turbine—

The hydraulic turbine (21) is disposed midway of the pipe (1), and is an exemplary fluid machine. In this example, the hydraulic turbine (21) includes an impeller and a casing. An impeller of a volute pump is used as the impeller. A shaft (19) is fixed to the center portion of the impeller. Then, the impeller is rotated under pressure by the water flow from a fluid inflow port of the casing. As a result, a fluid that has flowed into the hydraulic turbine (21) rotates the shaft (19). Note that the fluid that has flowed into the hydraulic turbine (21) is discharged from a fluid outflow port of the casing.

—Generator—

The generator (22) is connected to the shaft (19) of the hydraulic turbine (21) to be rotated, thereby generating electric power. In this example, the generator (22) includes a permanent magnet embedded rotor and a stator having a coil.

—Piping System—

The pipe (1) is connected to an inflow pipe (11), an outflow pipe (14), a first (main) branch pipe (12), and a second (detour branch pipe (13). The pipe (1) of this embodiment is configured as a metal pipe (for example, a ductile iron pipe). The inlet end of the inflow pipe (11) is connected to the water storage tank (2). The outlet end of the outflow pipe (14) is connected to the water receiving tank (3). The first and second branch pipes (12) and (13) are connected together in parallel between the inflow pipe (11) and the outflow pipe (14). The first branch pipe (12) constitutes a main path through which water for driving the hydraulic turbine (21) flows. The second branch pipe (13) constitutes a bypass for bypassing the hydraulic turbine (21).

A flowmeter (17), a first (main) electromagnetic valve (15), and the hydraulic turbine (21) are connected to the first branch pipe (12) in this order in the flow direction. A first pressure sensor (23) is disposed at the fluid inflow port of the hydraulic turbine (21), and a second pressure sensor (24) is disposed at the fluid outflow port of the hydraulic turbine (21). The fluid outflow port is connected to the outflow pipe (14). The second branch pipe (13) is connected to a second (detour) electromagnetic valve (16) serving as an on-off valve.

The flowmeter (17) is configured to be operated by electricity. The flowmeter (17) detects the flow rate (Q) of the water flowing through the hydraulic turbine (21), and outputs a detection signal.

The first electromagnetic valve (15) is a normally closed two-way electromagnetic valve, which maintains its closed state when not electrified, and maintains its open state when electrified. Note that the first electromagnetic valve (15) is electrified under normal conditions (when no abnormality is detected), and is in the open state.

The first pressure sensor (23) detects the pressure of the water flowing into the hydraulic turbine (21). The second pressure sensor (24) detects the pressure of the water flowing out of the hydraulic turbine (21). These pressure sensors (23, 24) constitute abnormality detectors.

The second electromagnetic valve (16) is a normally open two-way electromagnetic valve, which maintains its open state when not electrified, and maintains its closed state when electrified. Note that the second electromagnetic valve (16) is electrified under normal conditions (when no abnormality is detected), and is in the closed state.

—System Interconnection Inverter—

The system interconnection inverter (30) includes a plurality of switching elements which constitute an inverter unit. DC power from the generator controller (40) is input to the system interconnection inverter (30). By switching the plurality of switching elements, the DC power is converted into AC power. The AC power converted by the system interconnection inverter (30) is supplied (reversely flowed) to the electric power system (8).

—Generator Controller—

As shown in FIG. 2, the generator controller (40) (control unit) includes an AC/DC converter (41), a generator control unit (50), and an electromagnetic valve control unit (60).

—AC/DC Converter—

The AC/DC converter (41) includes a plurality of switching elements, and converts the electric power (AC power) generated by the generator (22) into DC power by switching. The output of the AC/DC converter (41) is smoothed by a smoothing capacitor, and is output to the system interconnection inverter (30).

—Generator Control Unit—

The generator control unit (50) executes flow rate control so as to bring the flow rate (Q) of water flowing through the hydraulic turbine (21) close to a target flow rate. Here, the target flow rate is determined, for example, according to a request of a target to which water from the pipe (1) is supplied. The generator controller (40) receives a flow rate command value (Q*) corresponding to the target flow rate.

The generator control unit (50) includes a microcomputer and a memory device storing a program for operating the microcomputer. The generator control unit (50) includes a flow rate controller (51), a torque controller (52), and a pulse width modulation (PWM) controller (53).

The flow rate control unit (51) receives the flow rate (Q) of the water detected by the flowmeter (17) and the flow rate command value (Q*) which is the target flow rate. Here, the flow rate command value (Q*) corresponds to the target flow rate described above. The flow rate controller (51) calculates a torque command value (T*) for converging the flow rate (Q) to the flow rate command value (Q*).

The torque controller (52) receives the torque command value (T*) which is a control target of the generator (22). The torque controller (52) calculates a voltage command value (V*) in accordance with the torque command value (T*).

The PWM controller (53) executes PWM control of the switching elements of the AC/DC converter (41) based on the voltage command value (V*) output from the torque controller (52). As a result, the flow rate (Q) converges to the flow rate command value (Q*).

—Electromagnetic Valve Control Unit—

The electromagnetic control unit (60) includes a microcomputer and a memory device storing a program for operating the microcomputer. The electromagnetic valve control unit (60) includes a head calculator (62), a head determiner (63), and an electromagnetic valve controller (64).

The head calculator (62) receives a pressure, detected by the first pressure sensor (23), of the water through the fluid inflow port of the hydraulic turbine (21) (a first pressure value p1), and a pressure, detected by the second pressure sensor (24), of the water through the fluid outflow port of the hydraulic turbine (21) (a second pressure value p2). The head calculator (62) obtains the effective head of the hydraulic turbine (21) based on the difference between these pressure values (p1, p2).

The head determiner (63) determines whether or not the hydroelectric generation system (10) is in an abnormal state, based on the effective head output from the head calculator (62) and the flow rate (Q) output from the flowmeter (17).

If a determination is made that the hydroelectric generation system (10) is in an abnormal state, the electromagnetic valve controller (64) controls the first and second electromagnetic valves (15) and (16) such that these electromagnetic valves (15) and (16) are not electrified.

<Operation Parameters of Hydroelectric Generation System>

The operation parameters of the hydroelectric generation system (10) and their relationships will now be described in detail with reference to FIG. 3. In the graph (also referred to as a characteristic map (M)) shown in FIG. 3, the vertical axis represents the effective head (H) of the hydraulic turbine (21), and the horizontal axis represents the flow rate (Q) of the water flowing through the hydraulic turbine (21). Here, the effective head (H) of the hydraulic turbine (21) is obtained through subtraction of a head corresponding to a pipe resistance, while the water in the water storage tank (2) flows to the water receiving tank (3) via the pipe (1), from a gross head (Ho) between the liquid level of the water storage tank (2) and the liquid level of the water receiving tank (3).

Figure 3:
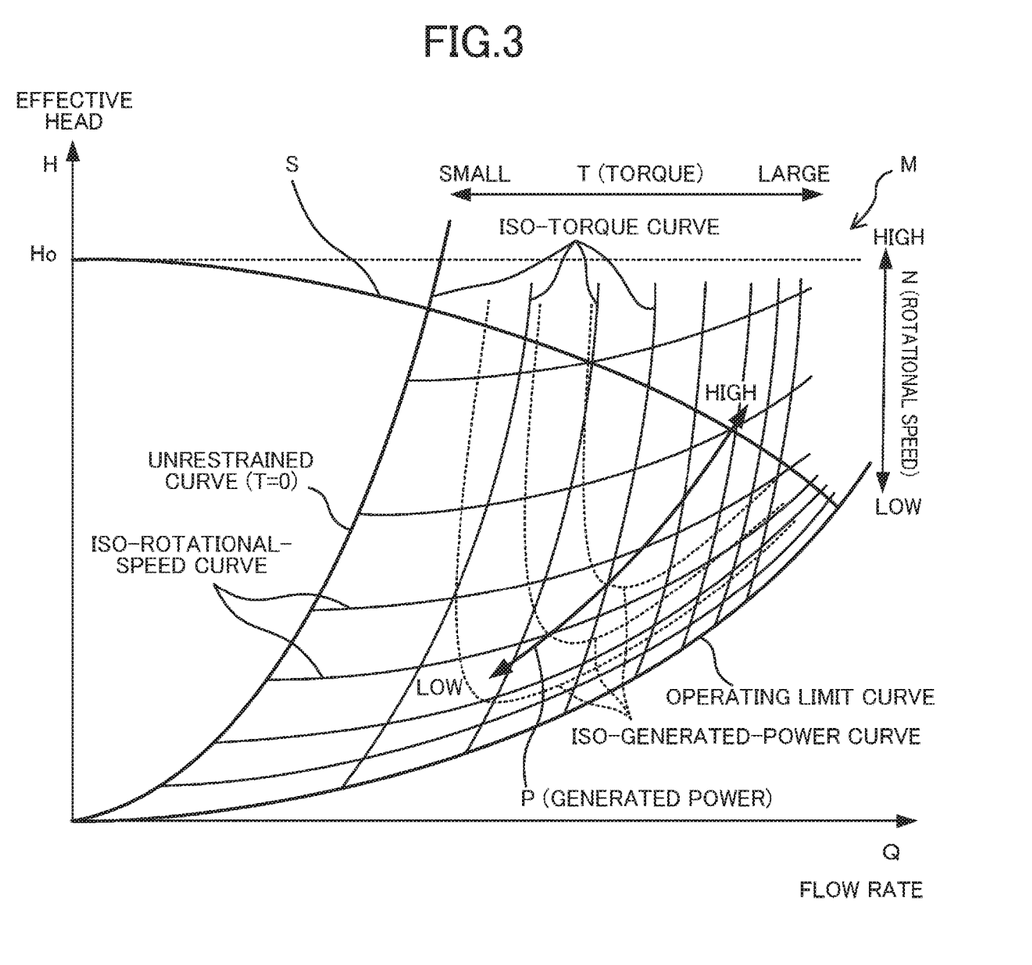
FIG. 3 is a graph showing a characteristic map of the hydroelectric generation system.

The relationship between the effective head (H) and the flow rate (Q) can be represented by a flow resistance characteristic line (also referred to as a system loss curve (S)) shown in FIG. 3. The characteristics of the system loss curve (S) are that the effective head (H) when the flow rate (Q)=0 is the gross head (Ho), and that the effective head (H) is reduced in the second order curve in accordance with the increase in the flow rate (Q). The curvature of the system loss curve (S) has a value unique to the pipe (1) in FIG. 1. The flow rate (Q) in the pipe (1) included in the hydroelectric generation system (10) and the effective head (H) at that time correspond to points on the system loss curve (S). That is to say, the point (the operation point of the hydraulic turbine (21)) corresponding to the flow rate (Q) and the effective head (H) of the hydraulic turbine (21) is always on the system loss curve (S).

In the characteristic map (M) of FIG. 3, the torque value (T) of the generator (22), the number of rotations (rotational speed) (N) of the generator (22), and the generated electric power (P) of the generator (22) are represented as the characteristics correlated with the flow rate (Q) and the effective head (H) in the hydraulic turbine (21).

In the characteristic map (M), a region (referred to as a hydraulic turbine region or an operable region) in which the hydraulic turbine (21) can be rotated by the water flow is formed between a curve (referred to as an unrestrained curve (T=0)) in which the torque value (T) of the generator (22) is 0 and a curve (referred to as an operating limit curve) in which the number of rotations (N) of the generator (22) is 0 or a predetermined minimum number of rotations. In FIG. 3, a region on the left of the unrestrained curve is a hydraulic turbine brake region (a power running region).

In the hydraulic turbine region, a plurality of iso-torque curves are provided along the unrestrained curve, and the torque value (T) also increases in accordance with the increase in the flow rate (Q) on the characteristic map (M). Further, a plurality of iso-rotational-speed curves are provided along the operating limit curve, and the number of rotations (N) increases with the increase in the effective head (H). On the system loss curve (S), the torque value (T) decreases with the decrease in the flow rate (Q). Further, on the system loss curve (S), the number of rotations (N) decreases with the increase in the flow rate (Q). An iso-generated-power curve indicated by a broken line is a curve convex downward, and the generated electric power (P) also increases with the increase in the effective head (H) and the flow rate (Q).

The relationship among the parameters in the characteristic map (M) described above can be stored in the memory device in the form of a table (numerical table) or a mathematical formula (function) in the program. Therefore, the generator controller (40) can perform various calculations and control using the relationship among the parameters represented in the characteristic map (M).

«Operation»

Figure 4:
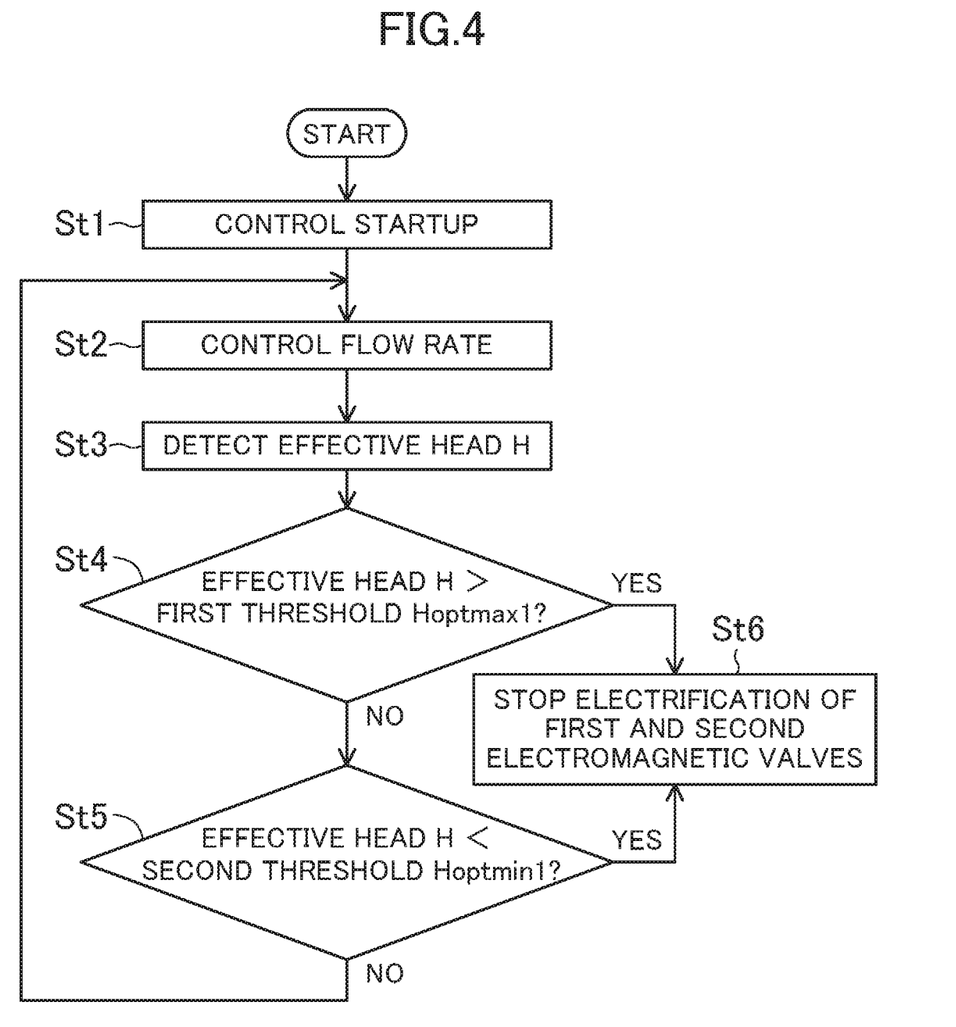
FIG. 4 is a flowchart of the operation of the hydroelectric generation system.

The operation of the hydroelectric generation system (10) will be described with reference to FIG. 4. In FIG. 4, when the operation of the hydroelectric generation system (10) is started, the generator controller (40) executes start-up control to electrify the first and second electromagnetic valves (15) and (16) (Step St1). Under the start-up control, the first electromagnetic valve (15) is opened, and the second electromagnetic valve (16) is closed. Thus, water does not flow through the second branch pipe (13) but flows through the first branch pipe (12). Then, in the hydraulic turbine region, the relationship between the effective drop (H) and the flow rate (Q) moves on the unrestrained curve from the point at which the flow rate (Q) is equal to 0 to the intersection point of the system loss curve (S) and the unrestrained curve.

Then, flow rate control is executed to bring the flow rate (Q) in the hydraulic turbine (21) close to the target flow rate (Step St2). That is to say, in the flow rate control, the generator control unit (50) calculates the torque command value (T*) based on the current flow rate (Q) and the flow rate command value (Q*). The PWM controller (53) controls the switching elements of the AC/DC converter (41) based on the voltage command value (V*) calculated by the torque controller (52). This brings the flow rate (Q) in the hydraulic turbine (21) or the pipe (1) close to the flow rate command value (Q*). Then, if the flow rate control is performed after the start-up control, the relationship between the effective head (H) and the flow rate (Q) moves on the system loss curve (S) from the intersection point of the system loss curve (S) and the unrestrained curve. Thus, the torque increases until the flow rate (Q) reaches the flow rate command value (Q*).

Next, in Step St3, the head calculator (62) detects the effective head (H) of the hydraulic turbine (21). In Step St4, the effective head (H) is compared with a first threshold value (Hoptmax1). Here, the first threshold value (Hoptmax1) is a determination value for determining whether or not the operation point of the hydraulic turbine (21) has reached a cavitation region, and varies depending on the flow rate command value (Q*). In Step St4, if the effective head (H) is larger than the first threshold value (Hoptmax1), it is determined that the operation point of the hydraulic turbine (21) is in the cavitation region. In this case, a determination is made that the hydroelectric generation system (10) is in an abnormal state. Then, the process proceeds to step St6, in which electrification of the first and second electromagnetic valves (15) and (16) is stopped, and the first and second electromagnetic valves (15, 16) are not electrified. In Step St4, if the effective head (H) is smaller than the first threshold value (Hoptmax1), the process moves to Step St5.

Here, cavitation is a phenomenon (a cavity phenomenon) in which, since a fluid is accelerated inside the hydraulic turbine (21), the pressure of the fluid is decreased to be close to a saturated water vapor pressure, and a large number of vapor bubbles are generated. When a large number of vapor bubbles are generated in association with the occurrence of cavitation, and then, these vapor bubbles disappear, a very high pressure of several tens of thousands of atmospheres is locally generated. As a result, this causes problems such as deterioration of the performance of the hydraulic turbine (21), damage to the surface of the hydraulic turbine (21), and generation of vibration and noise. Thus, in this embodiment, if the operation point of the hydraulic turbine (21) is in the cavitation region, a determination is made that the hydroelectric generation system (10) is in an abnormal state.

In Step St5, the effective head (H) is compared with a second threshold value (Hoptmin1). Here, the second threshold value (Hoptmin1) is a determination value for determining whether or not the hydraulic turbine (21) has reached the operating limit curve, and varies depending on the flow rate command value (Q*). In Step St5, if the effective head (H) is smaller than the second threshold value (Hoptmin1), it is determined that the operation point of the hydraulic turbine (21) has reached the operating limit curve. In this case, a determination is made that the hydroelectric generation system (10) is in an abnormal state. Then, the process proceeds to step St6, in which electrification of the first and second electromagnetic valves (15) and (16) is stopped, and the first and second electromagnetic valves (15, 16) are not electrified. In Step St5, if the effective head (H) is larger than the second threshold value (Hoptmin1), the process moves to Step St2.

The operating limit curve as used herein is a boundary of the operation point at which it becomes impossible to adjust the flow rate (Q) in the hydraulic turbine (21) to the flow rate command value (Q*) by the generator (22) due to the number of rotations of the generator (22) reaching 0 or a predetermined minimum number of rotations. Therefore, if the operation point of the hydraulic turbine (21) reaches the operating limit curve, the flow rate control cannot be continuously executed thereafter. Thus, in this embodiment, if the operation point of the hydraulic turbine (21) reaches the operating limit curve, a determination is made that the hydroelectric generation system (10) is in an abnormal state.

Advantages of Embodiment

According to this embodiment, when power is not lost, the second electromagnetic valve (16) is electrified, and is thus closed. Thus, water flows through the first branch pipe (12) without flowing through the second branch pipe (13). On the other hand, when power is lost, the second electromagnetic valve (16) is opened without being electrified. Thus, water flows into the second branch pipe (13). Thus, even if the generator controller (40) is stopped when power is lost, the state of the second electromagnetic valve (16) changes into the open state, and water is guided to the second branch pipe (13). This allows water to flow through the pipe (1) at a predetermined flow rate (Q) and a predetermined pressure.

Further, according to this embodiment, the hydroelectric generation system (10) includes first and second pressure sensors (23) and (24) for detecting cavitation and an operating limit as abnormalities in the hydroelectric generation system (10). The first and second pressure sensors (23, 24) detect abnormalities based on the effective head of the hydraulic turbine (21). Therefore, even before the loss of power causes the pipe (1) through which water flows to change, an abnormal state of the hydroelectric generation system (10) allows the pipe (1) through which water flows to change from the first branch pipe (12) to the second branch pipe (13). This allows water to flow through the pipe (1) at a predetermined flow rate (Q) and a predetermined pressure, and can reduce water flowing through the hydraulic turbine (21) in a state where an abnormality such as cavitation has occurred in the hydroelectric generation system (10).

Furthermore, according to this embodiment, the first electromagnetic valve (15) is disposed upstream of the hydraulic turbine (21) in the first branch pipe (12). The first electromagnetic valve (15) maintains its closed state when not electrified, and maintains its open state when electrified. Thus, when power is lost, the second electromagnetic valve (15) is closed without being electrified. This prevents water from flowing into the first branch pipe (12). When any one of the abnormality detectors detects an abnormality, the first electromagnetic valve (15) that is not electrified can prevent water from flowing through the first branch pipe (12).

According to this embodiment, since the electromagnetic valves are used as on-off valves, the pipe (1) through which water flows can be simply changed from the first branch pipe (12) to the second branch pipe (13) at low cost when power is lost.

First Variation of Embodiment

Figure 5:
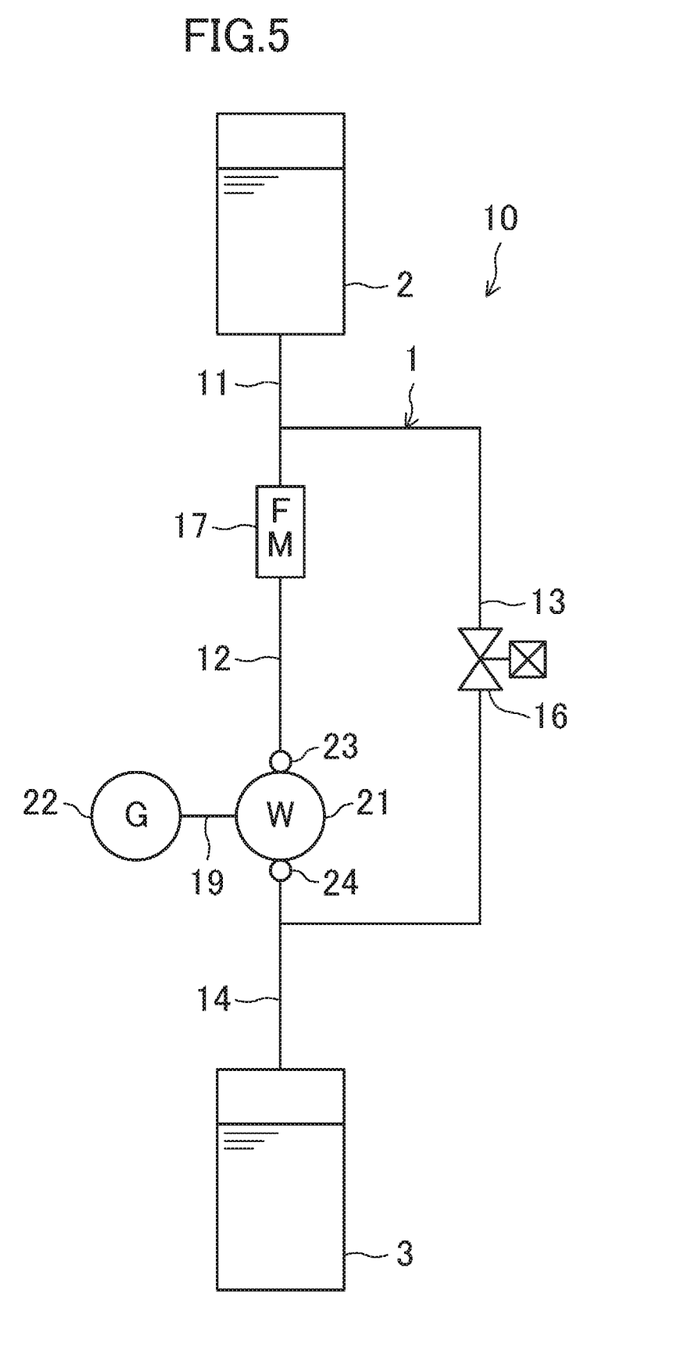
FIG. 5 corresponds to FIG. 1 and illustrates a first variation of the embodiment.

In the foregoing embodiment, the first electromagnetic valve (15) is provided upstream of the hydraulic turbine (21) in the first branch pipe (12). However, this configuration is merely a non-limiting example. In a first variation, as shown in FIG. 5, no first electromagnetic valve is provided upstream of the hydraulic turbine (21) in the first branch pipe (12). Even in this case, when power is lost, the second electromagnetic valve (16) is opened without being electrified. Thus, water flows into the second branch pipe (13). This allows water to flow through the pipe (1) at a predetermined flow rate (Q).

Second Variation of Embodiment

Figure 6:
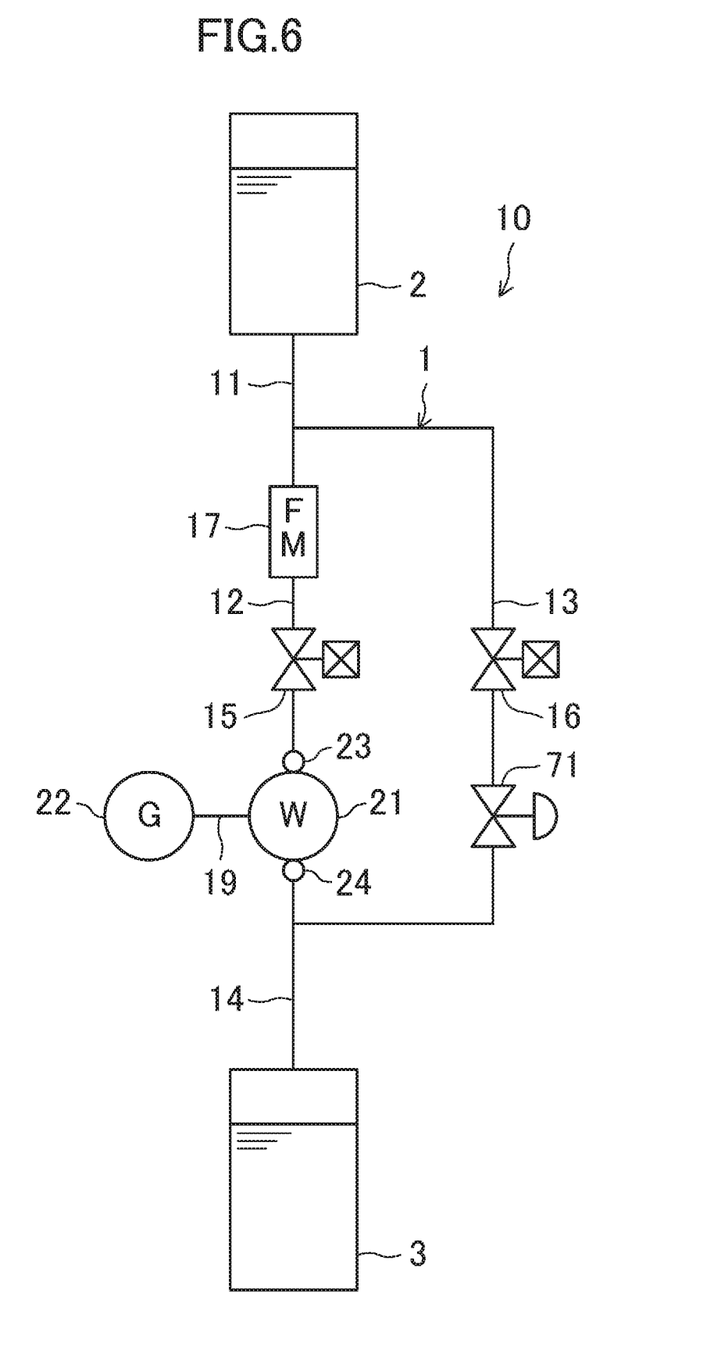
FIG. 6 corresponds to FIG. 1 and illustrates a second variation of the embodiment.

In a second variation, as shown in FIG. 6, a first adjuster (71), such as a constant flow rate valve or a decompression valve, is provided on the second branch pipe (13) to mechanically adjust the flow rate or pressure without electricity. This allows the adjuster to mechanically adjust the flow rate or pressure of a fluid when power is lost. Thus, even in an environment where water needs to flow at predetermined flow rate and predetermined pressure, the hydroelectric generation system (10) can be used. Further, when power is supplied, the generator control unit (50) adjusting the flow rate or pressure of the fluid flowing through the hydraulic turbine (21) allows the flow rate or pressure of the fluid flowing through the pipe (1) to be always adjusted either when power is supplied or when power is lost.

Third Variation of Embodiment

Figure 7:
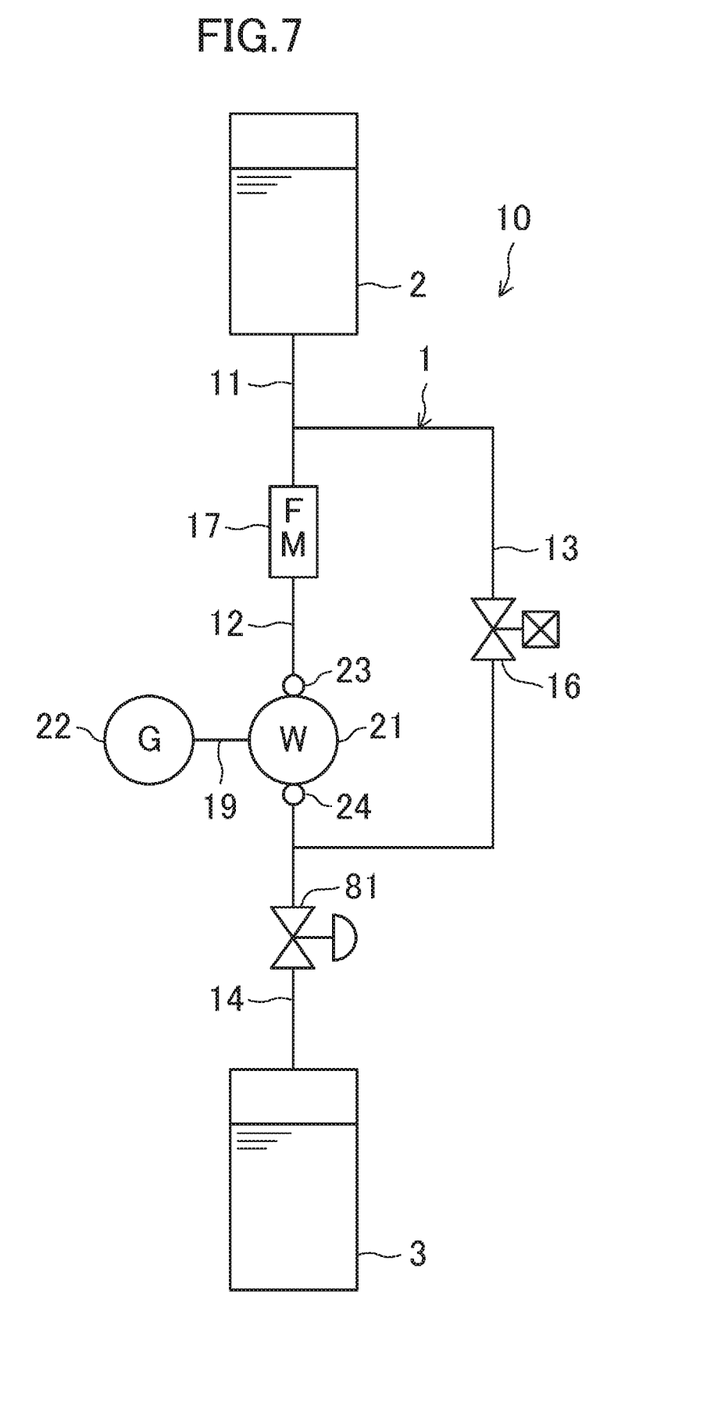
FIG. 7 corresponds to FIG. 1 and illustrates a third variation of the embodiment.

In a third variation, as shown in FIG. 7, a second adjuster (81), such as a constant flow rate valve or a decompression valve, is provided on the outflow pipe (14) to mechanically adjust the flow rate or pressure without electricity. This allows the flow rate or pressure of the fluid to be reliably adjusted.

Other Embodiments

The foregoing embodiment may be modified as follows.

In the foregoing embodiment, the pressure sensors (23, 24) detect cavitation and the operating limit of the hydraulic turbine (21) as abnormal states. However, this configuration is merely a non-limiting example. Examples of the abnormalities in the hydroelectric generation system (10) include overload, superheating, overspeed, and bearing overheat of the generator, and overvoltage, overcurrent, device abnormalities, overheat, and ground faults of an AC/DC converter or a system interconnection inverter. The abnormality detector merely needs to detect these abnormalities.

The electromagnetic valves (15, 16) may be configured to be capable of being electrified from a power supply via a switch, which may be opened/closed by the electromagnetic valve control unit (60). The electromagnetic valve is merely an example of the on-off valve. A main valve merely needs to be opened/closed in accordance with whether or not the valve is electrified.

In the foregoing embodiment, the flowmeter (17) is used to detect the flow rate (Q) of water flowing through the hydraulic turbine (21). However, this configuration is merely a non-limiting example. The flowmeter (17) does not have to be provided. In this case, for example, if the rotational speed and torque value (T) of the generator (22) are obtained, use of the above-described characteristic map (M) allows the flow rate (Q) of water flowing through the hydraulic turbine (21) to be determined.

As can be seen from the foregoing description, the present invention is useful for a hydroelectric generation system.

What is claimed is:

1. A hydroelectric generation system comprising:
a fluid machine disposed in a penstock or channel, the penstock or channel being configured for fluid to flow therethrough;
a generator driven by the fluid machine; and
a control unit configured to generate a predetermined torque in the generator; and
an abnormality detector configured to detect an abnormality in the hydroelectric generation system,
the penstock or channel having
a main path in which the fluid machine is disposed, and
a detour disposed in parallel with the main path,
the detour including a detour on-off valve, the detour on-off valve being opened when not electrified, and the detour on-off valve being closed when electrified,
upon the abnormality detector detecting the abnormality when the detour on-off valve is electrified, electrification of the detour on-off valve is stopped,
the abnormality detector detecting an abnormality based on an effective head of the fluid machine, the effective head being a difference between a first pressure at a fluid inflow port of the work machine and a second pressure at a fluid outflow port of the work machine.

2. The hydroelectric generation system of claim 1, wherein
the main path includes a main on-off valve, the main on-off valve is closed when not electrified, and the main on-off valve is opened when electrified, and
the detour includes an adjuster configured to mechanically adjust a pressure or a flow rate of the fluid.

3. The hydroelectric generation system of claim 1, wherein
the penstock or channel has an outflow pipe disposed downstream of the main path and the detour such that the main path and the detour are joined together, and
the outflow pipe includes an adjuster configured to mechanically adjust a pressure or a flow rate of the fluid.

* * * * *